US012556304B2

United States Patent
Govindaraju et al.

(10) Patent No.: US 12,556,304 B2
(45) Date of Patent: *Feb. 17, 2026

(54) METHODS FOR ADAPTIVE ERROR AVOIDANCE TO INCREASE RE-TRANSMISSION RELIABILITY IN TIME-SLOTTED COMMUNICATION LINKS

(71) Applicant: Analog Devices International Unlimited Company, Limerick (IE)

(72) Inventors: Prakash Govindaraju, Bangalore (IN); Avner Darren Fernandes, Vasco Da Gama (IN)

(73) Assignee: Analog Devices International Unlimited Company, Limerick (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,845

(22) Filed: Jul. 19, 2023

(65) Prior Publication Data

US 2023/0361916 A1 Nov. 9, 2023

Related U.S. Application Data

(62) Division of application No. 17/538,409, filed on Nov. 30, 2021, now Pat. No. 11,750,324.

(51) Int. Cl.
*H04L 1/18* (2023.01)
*H04L 1/00* (2006.01)
*H04L 1/1812* (2023.01)

(52) U.S. Cl.
CPC ............ *H04L 1/0091* (2013.01); *H04L 1/008* (2013.01); *H04L 1/0084* (2013.01); *H04L 1/009* (2013.01); *H04L 1/1816* (2013.01)

(58) Field of Classification Search
None
See application file for complete search history.

(56) References Cited

U.S. PATENT DOCUMENTS

| | | |
|---|---|---|
| 4,570,257 A | 2/1986 | Olson et al. |
| 6,958,986 B2 | 10/2005 | Cain |

(Continued)

FOREIGN PATENT DOCUMENTS

| | | |
|---|---|---|
| CN | 116208300 A | 6/2023 |
| EP | 3416322 A1 | 12/2018 |

(Continued)

OTHER PUBLICATIONS

"U.S. Appl. No. 17/538,409, Corrected Notice of Allowability mailed Apr. 27, 2023", 2 pgs.

(Continued)

*Primary Examiner* — Mujtaba M Chaudry
(74) *Attorney, Agent, or Firm* — Schwegman Lundberg & Woessner, P.A.

(57) ABSTRACT

A network node device of a communication network comprises physical (PHY) layer circuitry configured to transmit and receive data packets via a communication network; and processing circuitry connected to the PHY layer circuitry. The processing circuitry is configured to encode a data packet for sending according to a first communication protocol for sending to a second network node during a specified communication time slot, initiate resending of the data packet when the second network node does not respond during a specified acknowledge time slot, and encode the data packet according to a second communication protocol for sending to the second network node for a last retry attempt of a finite number of retry attempts, wherein the time to send the data packet formatted in the second communication protocol extends into the specified acknowledge time slot.

8 Claims, 6 Drawing Sheets

(56) References Cited

U.S. PATENT DOCUMENTS

| | | | |
|---|---|---|---|
| 6,975,647 | B2 | 12/2005 | Neale et al. |
| 7,088,701 | B1 | 8/2006 | Attar et al. |
| 7,133,396 | B1 | 11/2006 | Schmidl et al. |
| 7,298,718 | B2 | 11/2007 | Odenwalder et al. |
| 7,594,153 | B2 * | 9/2009 | Kim ..................... H04L 1/1812 |
| | | | 714/751 |
| 7,613,978 | B2 | 11/2009 | Jalali et al. |
| 8,160,002 | B2 | 4/2012 | Rajkotia et al. |
| 8,977,283 | B2 | 3/2015 | Chen et al. |
| 9,001,735 | B2 | 4/2015 | Padovani et al. |
| 9,148,236 | B2 * | 9/2015 | Ramkumar ............. H04L 1/189 |
| 9,374,818 | B2 | 6/2016 | Hirata et al. |
| 10,257,765 | B2 * | 4/2019 | Agee ..................... H04W 40/04 |
| 10,805,836 | B2 | 10/2020 | Yu et al. |
| 11,051,293 | B2 | 6/2021 | Tsai et al. |
| 11,051,299 | B2 | 6/2021 | Jung et al. |
| 11,750,324 | B2 | 9/2023 | Govindaraju et al. |
| 2004/0095907 | A1 * | 5/2004 | Agee ........................ H04B 7/10 |
| | | | 370/400 |
| 2006/0192697 | A1 * | 8/2006 | Quick .................. H04L 1/0041 |
| | | | 341/60 |
| 2008/0080549 | A1 * | 4/2008 | Rofougaran .......... H03F 1/0227 |
| | | | 370/458 |
| 2010/0011273 | A1 * | 1/2010 | Parolari ................ H04L 1/1614 |
| | | | 714/E11.113 |
| 2012/0054583 | A1 * | 3/2012 | Park ...................... H04L 1/0083 |
| | | | 714/776 |
| 2014/0006908 | A1 * | 1/2014 | Gruber .................. H04L 1/0072 |
| | | | 714/776 |
| 2014/0206367 | A1 * | 7/2014 | Agee .................. H04B 7/06952 |
| | | | 455/450 |
| 2016/0269096 | A1 * | 9/2016 | Thubert ............. H04B 7/15507 |
| 2017/0126293 | A1 * | 5/2017 | Chen ................... H04B 7/0452 |
| 2017/0264395 | A1 * | 9/2017 | Wakabayashi ........ H04L 1/1819 |
| 2019/0158251 | A1 | 5/2019 | Park et al. |
| 2020/0145144 | A1 | 5/2020 | Hosseini et al. |
| 2020/0229104 | A1 * | 7/2020 | MolavianJazi ....... H04W 52/54 |
| 2021/0152292 | A1 | 5/2021 | Fu et al. |
| 2021/0194724 | A1 * | 6/2021 | Lee ..................... H04J 14/0283 |
| 2021/0234640 | A1 | 7/2021 | Cirik et al. |
| 2021/0297199 | A1 * | 9/2021 | Miao ..................... H04L 1/1819 |
| 2022/0150950 | A1 * | 5/2022 | Islam .................... H04L 1/1812 |
| 2023/0171030 | A1 | 6/2023 | Govindaraju et al. |

FOREIGN PATENT DOCUMENTS

| | | |
|---|---|---|
| EP | 3528413 A1 | 8/2019 |
| JP | 2013013093 A | 1/2013 |
| KR | 102251215 B1 | 5/2021 |

OTHER PUBLICATIONS

"U.S. Appl. No. 17/538,409, Notice of Allowance mailed Apr. 19, 2023", 9 pgs.

"U.S. Appl. No. 17/538,409, Response filed Mar. 23, 2023 to Restriction Requirement mailed Jan. 27, 2023", 8 pgs.

"U.S. Appl. No. 17/538,409, Restriction Requirement mailed Jan. 27, 2023", 8 pgs.

"European Application Serial No. 22206007.1, Extended European Search Report mailed Mar. 27, 2023", 4 pgs.

Nadeem, Faisal, et al., "Non-orthogonal HARQ for URLLC: Design and Analysis", arXiv:2106.16144v1 [cs.NI]; 2019 IEEE International Communications Conference (ICC), Dublin, IE, (May 19, 2021), 15 pgs.

Tarchi, Daniele, et al., "Novel link adaptation for TETRA cellular systems", International Journal of Communication Systems, Wiley, Chichester, GB, vol. 22, No. 4, (Nov. 25, 2008), 483-501.

"European Application Serial No. 24192164.2, Extended European Search Report mailed Oct. 31, 2024", 9 pgs.

"European Application Serial No. 24192164.2, Response filed Feb. 18, 2025 to Extended European Search Report mailed Oct. 31, 2024", 23 pgs.

* cited by examiner

| MEASUREMENT INTERVAL | 100ms | | | | SLOT SIZE | 2500us | | | | MANAGER | 1 | | | | NODES | 9 | | | | | | | | | | |
|---|---|---|---|---|---|---|---|---|---|---|---|---|---|---|---|---|---|---|---|---|---|---|---|---|---|---|
| TIME ms | 0 | 2.5 | 5 | 7.5 | 10 | 13 | 15 | 18 | 20 | 23 | 25 | 28 | 30 | 33 | 35 | 38 | 40 | 43 | 45 | 48 | 50 | 53 | 55 | 58 | 60 | 63 | 65 | 68 |
| SLOT | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| MGR1 | Tx | 1 | 2 | 3 | 4 | 5 | 6 | 7 | 8 | 9 | Tx | 1 | 2 | 3 | 4 | 5 | 6 | 7 | 8 | 9 | Tx | 1 | 2 | 3 | 4 | 5 | 6 | 7 |

| TIME ms | 70 | 73 | 75 | 78 | 80 | 83 | 85 | 88 | 90 | 93 | 95 | 98 | 99 | 100 |
|---|---|---|---|---|---|---|---|---|---|---|---|---|---|---|
| SLOT | 28 | 29 | 30 | 31 | 32 | 33 | 34 | 35 | 36 | 37 | 38 | 39 | 40 | |
| MGR1 | 8 | 9 | Tx | 1 | 2 | 3 | 4 | 5 | 6 | 7 | 8 | 9 | Tx | |

FIG. 3

METHODS FOR ADAPTIVE ERROR AVOIDANCE TO INCREASE RE-TRANSMISSION RELIABILITY IN TIME-SLOTTED COMMUNICATION LINKS

CLAIM OF PRIORITY

This application is a divisional of U.S. patent application Ser. No. 17/538,409, filed on Nov. 30, 2021, which is hereby incorporated by reference in its entirety.

BACKGROUND

Communication networks transmit data among nodes of the network. The communication between any two network nodes can use one or more communication channels. Communication channels can be unreliable, and the contents of a transmitted message can be corrupted.

SUMMARY OF THE DISCLOSURE

This document relates generally to communication networks, and in particular to techniques for increasing the reliability of re-transmitted packets using error avoidance mechanisms without affecting slot time or requiring slot re-allocation. An example of a method of operating a communication network includes sending a data packet from a first network node of the communication network to a second network node during a specified communication time slot, wherein the data packet is formatted according to a first communication protocol; resending, by the first network node, the data packet when the second network node does not respond during a specified acknowledge time slot; and resending the data packet for a last retry attempt of a finite number of retry attempts to send the data packet, wherein the first network node resends the data packet for the last retry attempt according to a second communication protocol that extends time of sending the data packet into the specified acknowledge time slot.

An example of a network node device of a communication network includes physical (PHY) layer circuitry configured to transmit and receive data packets via a communication network; and processing circuitry connected to the PHY layer circuitry. The processing circuitry is configured to: encode a data packet for sending according to a first communication protocol for sending to a second network node during a specified communication time slot; initiate resending of the data packet when the second network node does not respond during a specified acknowledge time slot; and encode the data packet according to a second communication protocol for sending to the second network node for a last retry attempt of a finite number of retry attempts, wherein the time to send the data packet formatted in the second communication protocol extends into the specified acknowledge time slot.

Another example of a network node device of a communication network includes PHY layer circuitry and processing circuitry connected to the PHY layer circuitry. The processing circuitry is configured to decode a first received data packet according to a first communication protocol, encode an acknowledge message for sending when not detecting errors in the received data packet, detecting that the received data packet includes errors, and decode a subsequently received data packet according to a second communication protocol when the first received data packet includes errors.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is an illustration of time slots allocated for a communication network.

DETAILED DESCRIPTION

Figure 1:
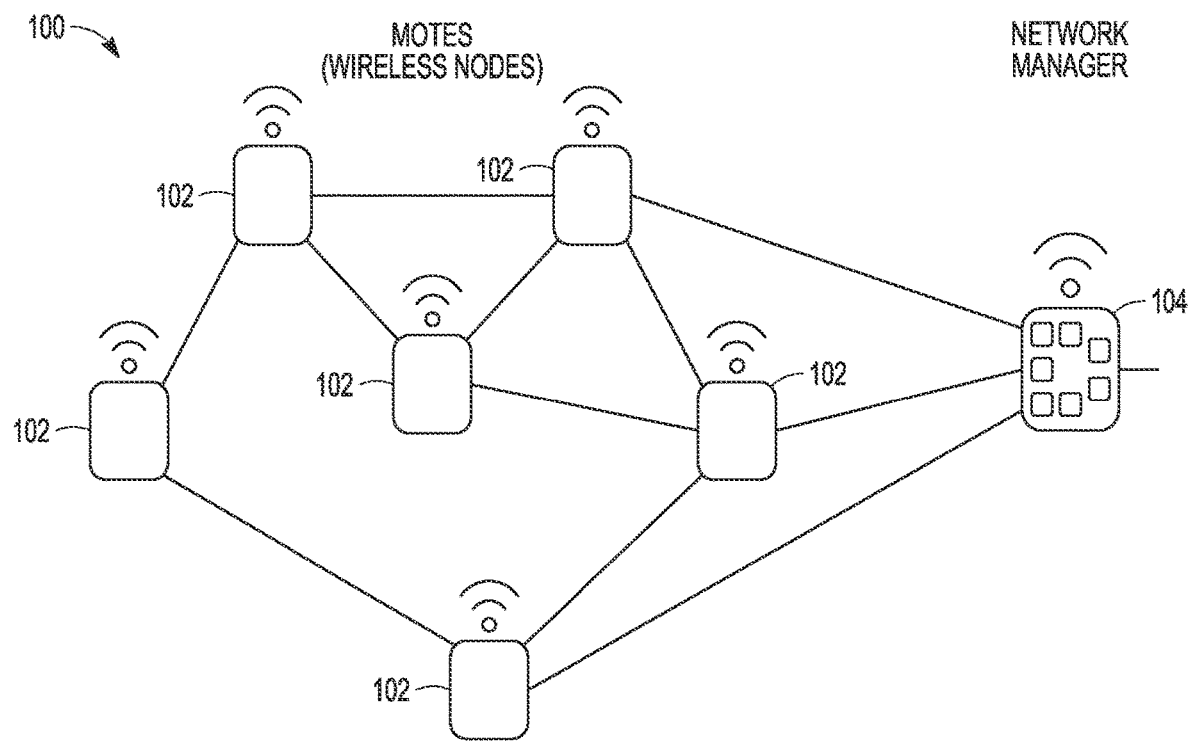
FIG. 1 is an illustration of a communication network.

FIG. 1 is a conceptual illustration of a communication network 100. The communication network 100 includes multiple network nodes 102 and a network manager node 104. In the example of FIG. 1, the communication links between network nodes 102 are wireless links and any network node 102 can communicate data with any other network node 102 within range. In variations, the communication links between network nodes 102 are wired links.

Figure 2:
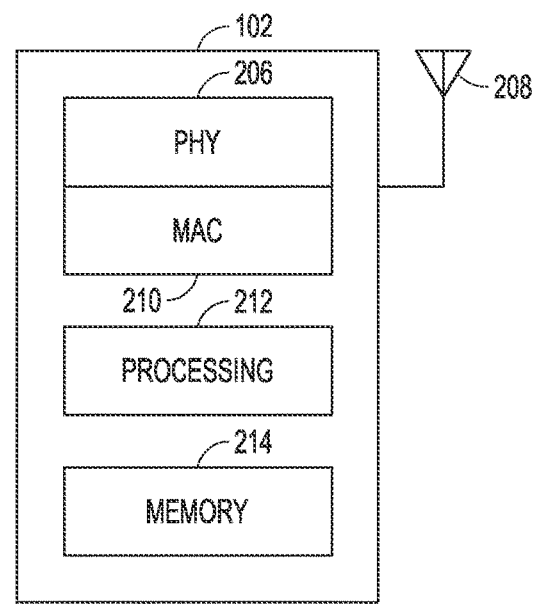
FIG. 2 is a functional block diagram of a network node.

FIG. 2 is a functional block diagram of a network node 102. The network node 102 may include physical layer (PHY) circuitry 206 for transmitting and receiving radio frequency electrical signals to and from one or more network node using one or more antennas 208. The PHY circuitry 206 may include circuitry for modulation/demodulation, upconversion/downconversion, filtering, amplification, etc. The network node 102 may also include medium access control layer (MAC) circuitry 210 for controlling access to the wireless medium and to configure frames or packets for communicating over the wireless medium. The network node 102 may also include processing circuitry 212 and memory 214 arranged to configure the various elements of the network node to perform the operations described herein. The memory 214 may be used to store information for configuring the processing circuitry 212 to perform the operations.

Although the network node 102 is illustrated as having several separate functional elements, one or more of the functional elements may be combined and may be implemented by combinations of software-configured elements, such as processing elements including digital signal processors (DSPs), and/or other hardware elements of the processing circuitry 212. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware, and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

FIG. 3 is an illustration of time slots allocated for a communication network, such as the communication network 100 of FIG. 1. Time slotted communication links quantize time into discrete periods of time called slots, during which node devices transmit or receive data packets. The data packets are transmitted according to a specified communication protocol that can define one or more of the format of the information in the data packet, format of preambles and headers required before the payload of data, the rate at which bits of the data packet are transmitted, delays between sending data, and the like. Typically, one network node will transmit during a time slot and one or more network nodes will receive the transmission using one or more communication channels. During the next time slot, different nodes and different communication channels will be active.

Time Division Duplex (TDD) refers to systems in which uplinks and downlinks are separated by allocating different periods in a slot or slot frame. Ensuring that a node device can transmit and receive only at a certain time reduces the chances that synchronized devices would 'collide' by multiple devices attempting to transmit at the same time. In time slotted communications, the time slots are demarcated periods in time that have been allocated for a certain set of devices to transmit data or to receive data. Time slotted channel hopping (TSCH) combines time slotted communications with synchronized channel hopping.

In transmitting data via communication channels there is typically a tradeoff relationship between raw data throughput and reliability (i.e., resilience of the link to interference and noise). Communication channels can become unreliable, and contents of a message transmitted can be corrupted. A single weak communication link could affect one or more of the timing, throughput, and latency of the rest of the system. To increase the reliability of communication, the receiving network node (receiver) usually acknowledge packets by sending an acknowledge message (ACK) back to the transmitting network node (transmitter).

Figure 4:
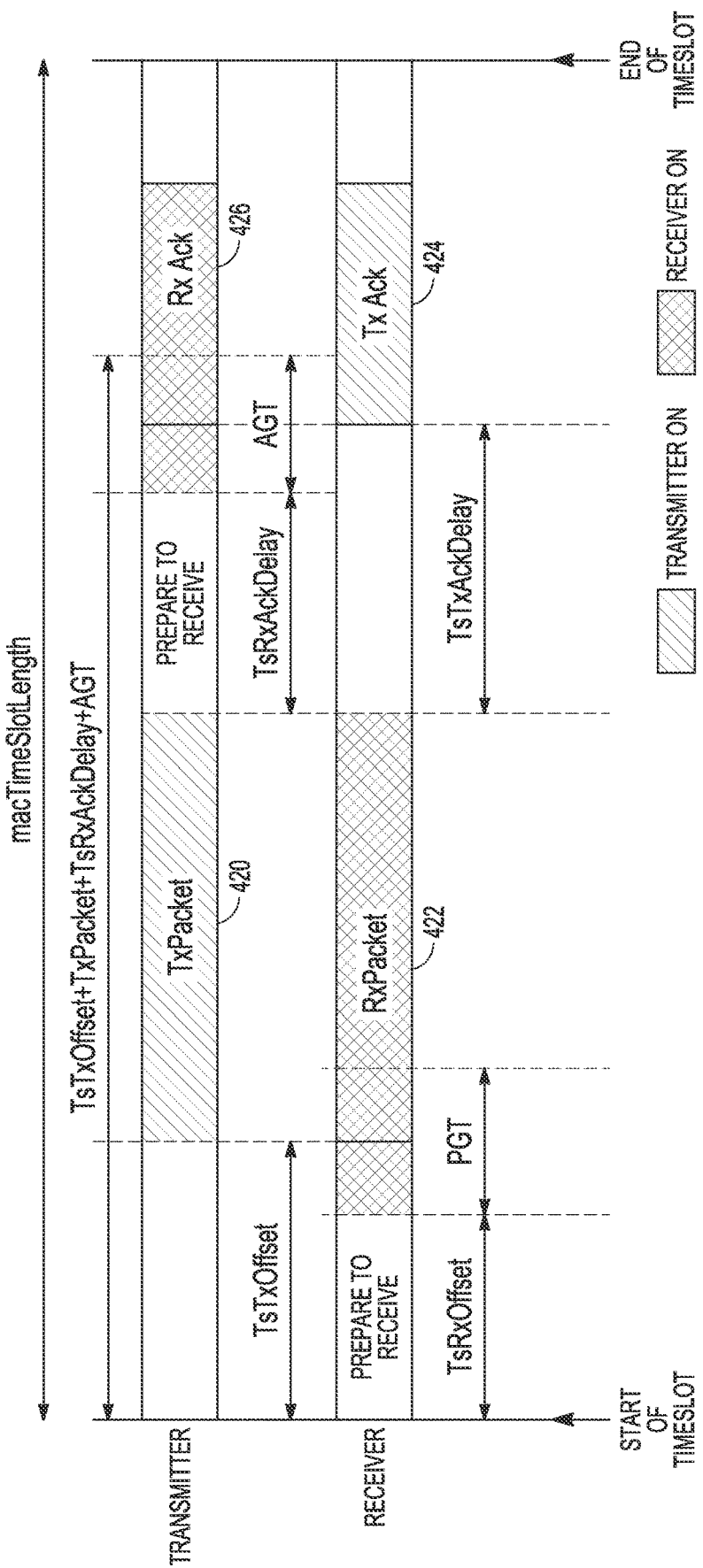
FIG. 4 is a timing diagram illustrating an example of a time slot.

FIG. 4 is a timing diagram illustrating an example of a time slot. During the time slot, a data packet is transmitted 420 by a transmitter node, the data packet is received 422 by the receiver node, the receiver node transmits 424 an ACK acknowledging the receipt of the data packet, and the ACK message is received 426 by the transmitter node. The data packet includes a preamble and header portion required by the protocol and a payload portion that contains the useful information being communicated.

If the communication channel is unreliable, the data packet message won't be decoded correctly and will include errors. The errors can be detected by the receiver node using error detection circuitry such as cyclic redundancy code (CRC) circuitry foe example. If the receiver node detects errors, it will not send back an ACK to the transmitter node. After a period of time of not receiving an ACK, the transmitter node will retry sending the data packet again. The transmitter node will retry sending the packet a finite number of times and will eventually drop the packet (not retry and the sending fails) if an ACK is not received during the retry attempts.

In time slotted systems, a time slot can be broadly divided into the following regions:

Slot time=pre-transmit+pkt header+packet+turn-around+ACK header+ACK+post-slot processing.

Where:
Pre-transmit could include some processing, transceiver ramp-up and/or guard times.
Pkt header is the time taken to transmit the preamble, start frame delimiter (SFD) and/or header (if any).
Packet refers to the time for the actual payload.
Turnaround can involve time for some degree of processing on the receivers end to validate the contents of the received data, as well as transceiver turnaround.
ACK header is the time taken to transmit the preamble, SFD and/or header (if any).
ACK refers to the time taken to transmit the acknowledgement.
Post-slot processing refers to time for ACK processing, transceiver state control, and other tasks.

From this breakdown of the allotment of the slot time, it can be seen that the slot time (and therefore effective channel throughput) depends on the effective data rate of the transceiver, and the size of the payload. Lengthy payloads and low transceiver data rates increase the time it takes to transmit the headers and payloads (packet and ACK), while short payloads and high transceiver data rates have the opposite effect.

However, the final effective data rate doesn't solely depend on the payload size or data rate of the transceiver because the other phases (e.g., the pre-transmit, turnaround, post-slot processing etc.) don't necessarily scale with the transceiver's data rate. Doubling the effective packet & ACK time by changing the PHY mode, coding rate or transceiver payload size would require more time for those phases, leading to an increase in slot duration. Systems that use adaptive PHY rates tend to select different modulation schemes with higher coding rates to increase reliability when the link quality decreases, but this increases the time taken to transmit the packet and ACK; resulting in longer time slots and lower effective throughput.

ACK messages help the transmitter node determine whether a data packet was correctly received by the receiver node. If the data packet was not received correctly, an ACK is not returned, and the transmitter node can try to resend the packet again. When the transmitter needs to retry sending a data packet, the 'packet' transmission phase could be extended beyond its typically allocated time and make use of the time that is normally allocated for radio turnaround and ACK reception.

These "un-ACK'ed" time slots will have longer packet phases and will be unidirectional because nothing is returned by the receiver node during the time slot. If the time slot is being for the last retry attempt in a slot frame or measurement interval, the ACK doesn't serve any purpose. The data will be discarded anyway, and the transmitter node doesn't need to know that the data was received correctly. The time taken by the ACK of the last retry attempt can be better utilized by switching to a different mode that might be more resilient to errors (at the cost of a lower data rate and packet time) to ensure higher chances of success.

Figure 5:
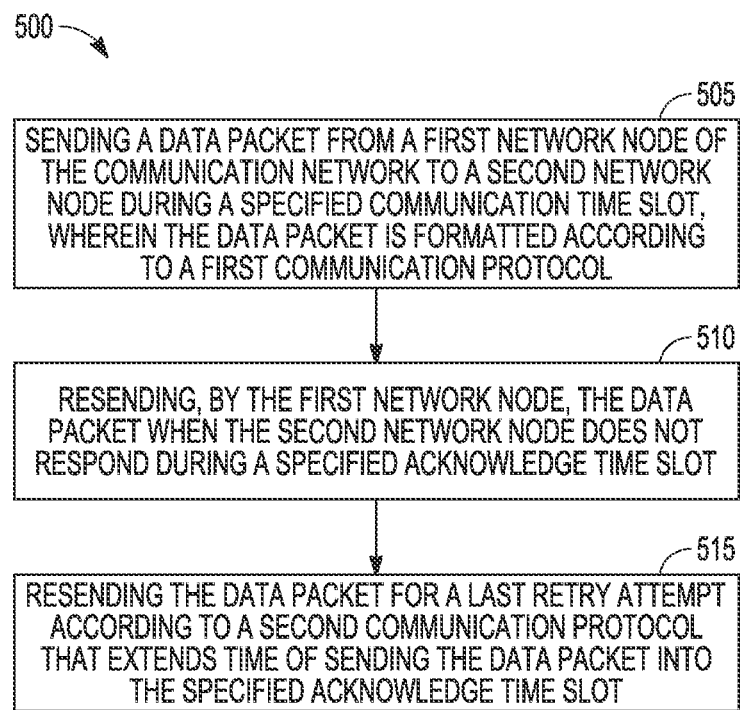
FIG. 5 is a flow diagram of an example of operating a communication network.

FIG. 5 is a flow diagram of an example of operating a communication network, such as the communication network of FIG. 1. At 505, the processing circuitry of a transmitter node encodes a data packet for sending to one or more receiver nodes during a specified communication time slot. The data packet is formatted according to a first communication protocol that defines one or both of the amount of data in the packet and the rate at which the data is sent. The receiver node decodes the packet. If no errors are detected by the receiver node, the processing circuitry of the receiver node encodes an ACK message for sending to the transmitter node that the data packet was received. If errors are detected, the receiver node does not send an ACK message.

If an ACK from the receiver node is not received by the transmitter node during a specified acknowledge time slot in response to the sending, at block 510 the processing circuitry of the transmitter node initiates resending the data packet. The processing circuitry initiates resending the data packet for a finite number of retry attempts if the receiver node does not respond with an ACK message.

At block 515, the transmitter node initiates resending the data packet for a last retry attempt. The processing circuitry of the transmitter node encodes the data packet of the last retry attempt according to a different communication protocol that is more robust to errors. The second communication protocol uses one or more approaches to reduce errors or recover from errors at the cost of a lower data rate and longer packet transmit time. The last retry attempt extends the time of sending the data packet into the specified acknowledge time of the time slot. The receiver node decodes the last retry attempt according to the second communication protocol and stores the data in the data packet if no errors are detected in the data packet or discards the data packet if errors are detected. The receiver node does not send an ACK message regardless of whether the data packet was received successfully or not.

Figure 6:
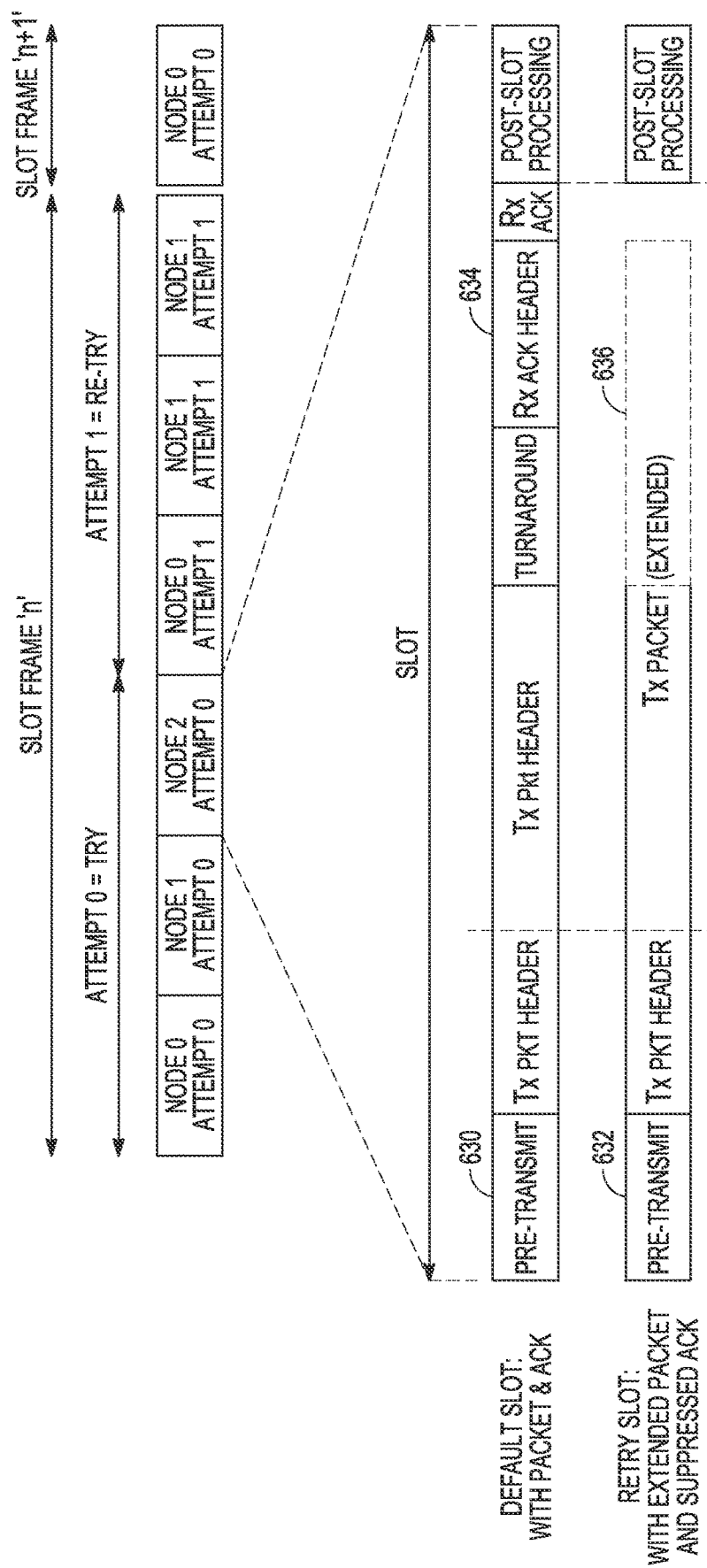
FIGS. 6-8 are illustrations of transmitting a data packet using different communication protocols.

FIG. 6 is an illustration of transmitting the data packet according to the non-extended communication protocol format 630 and the extended communication protocol format 632. The non-extended protocol format 630 shows the time reserved 634 for the ACK message in the time slot. The extended communication protocol format 632 shows the payload portion of the data packet 636 being transmitted for a time that extends into the time reserved 634 for the ACK message in the time slot. The return ACK message is suppressed in the extended communication protocol format 632.

The time to transmit the payload portion of the data packet 636 may be extended because the size of the payload of the data packet is increased to include measures to recover from data errors in the transmission, such as including error avoidance coding. An example of error avoidance coding are error correction codes (ECC) and forward error correction (FEC).

Error correction codes are algorithms that are used to encode bits of data such that errors can be detected (and possibly corrected) if the received data packet is corrupted. ECC techniques generally involve appending redundant information to the original data payload. The receiver node decodes the ECC and uses it to detect and correct errors in the original payload. Because the ECC is of non-zero size, there is an overhead that is associated with these codes though they offer better reliability and resilience. In FIG. 6, the data payload may include ECC. This results in a larger payload that extends into the time reserved 634 for the ACK message in the time slot.

The time to transmit the payload portion of the data packet 636 may also be extended because one or both of the header and the payload of the data packet are transmitted at a slower rate than the non-extended protocol. The processing circuitry of the transmitter network node may change the PHY mode to change the data rate.

Figure 7:
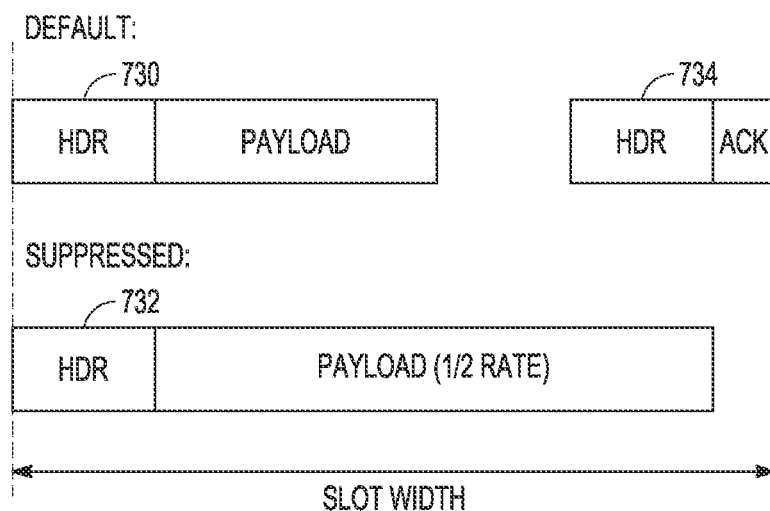
Figure 8:
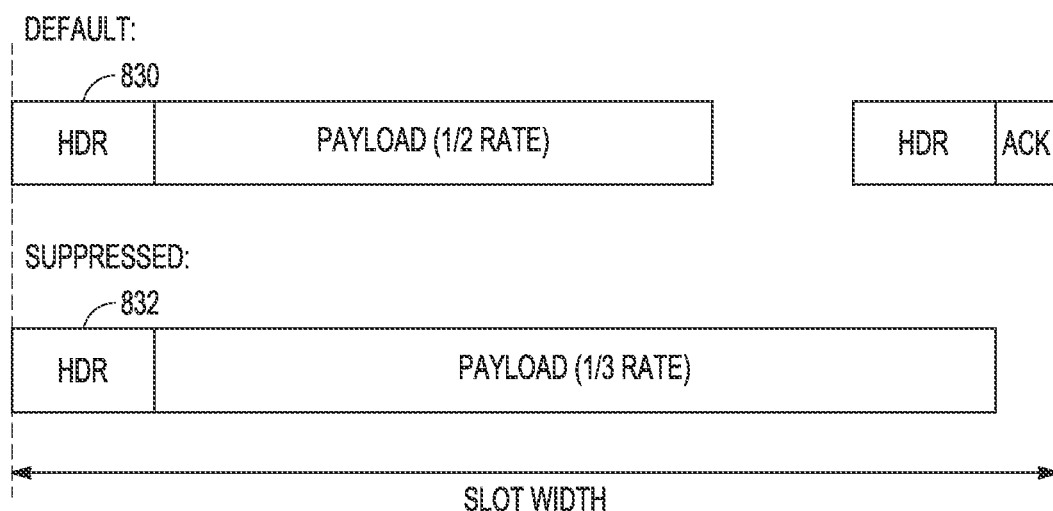

FIG. 7 is an illustration of transmitting the data packet according to the normal communication protocol format 730 and the extended communication protocol format 732 used for the last retry attempt. The ACK message is suppressed and the data packet is sent at a slower rate (e.g., half the rate of the normal protocol) with the result that the data payload that extends into the time reserved 734 for the ACK message in the time slot. FIG. 8 is an illustration of another example transmitting the data packet according to the normal communication protocol format 830 and the extended communication protocol format 832. In the example, the communication channel is already running at one half the data rate (e.g., for error avoidance) and the data rate is further slowed to one third the data rate.

As shown in FIGS. 6-8, if the time taken by the new packet is less than the time originally allocated to the turnaround and ACK, this method of adaption can be used in the same network without affecting the overall size of the slot time, where Slot time=pre-transmit+pkt header+packet+post-slot processing.

The slot time will remain unchanged if:

(Packet with error avoidance)<=(packet+turnaround+ACK header+ACK).

The time taken by the extended last retry data packet needs to be within the limits of the allotted slot time, and the receiver node needs to be able to detect the transmit mode (or know it in advance) to enable it to correctly receive it. In some examples, the header portion of the data packet in the extended communication protocol format indicates that the data packet uses the extended communication protocol. This would allow the receiver node to receive and decode these data packets with the extended communication protocol without any prior intimation or entry in the transmit schedule. In some examples, the processing circuitry of the receiver node counts the number of retry attempts, which is a predetermined number of attempts. The number of retry attempts may be communicated among the nodes (e.g., by the network manager node 104 in FIG. 1). When the processing circuitry of the receiver node detects that the next attempt will be the last retry attempt, the receiver node may change to the extended communication protocol. These examples are just some of the many methods that are possible for the receiver to use to receive packets of both formats.

The several examples of systems, devices, and methods described provide techniques for increasing the reliability of re-transmitted packets using stronger error-avoidance mechanisms without affecting the slot time or requiring slot re-allocation. Any error-avoidance mechanism can be used as long as the overhead for activating the error-avoidance mechanism fits within the allotted slot time for communication.

Additional Description and Aspects

A first Aspect (Aspect 1) includes subject matter (such as network node device of a communication network) comprising physical (PHY) layer circuitry configured to transmit and receive data packets via a communication network; and processing circuitry connected to the PHY layer circuitry. The processing circuitry is configured to encode a data packet for sending according to a first communication protocol for sending to a second network node during a specified communication time slot; initiate resending of the data packet when the second network node does not respond during a specified acknowledge time slot; and encode the data packet according to a second communication protocol for sending to the second network node for a last retry attempt of a finite number of retry attempts, wherein the time to send the data packet formatted in the second communication protocol extends into the specified acknowledge time slot.

In Aspect 2, the subject matter of Aspect 1 optionally includes processing circuitry configured to change the PHY mode to reduce a data rate of the data packet.

In Aspect 3, the subject matter of one or both of Aspects 1 and 2 optionally includes processing circuitry configured to reformat the data packet in the last retry attempt to increase data redundancy in the data packet from the first communication protocol.

In Aspect 4, the subject matter of one or any combination of Aspects 1-3 optionally includes processing circuitry configured to reformat the data packet in the last retry attempt to increase a payload of the data packet.

In Aspect 5, the subject matter of one or any combination of Aspects 1-4 optionally includes processing circuitry configured to reformat the data packet in the last retry attempt to increase the number of copies of the data in the payload of the data packet and protect each of the copies with error avoidance coding.

In Aspect 6, the subject matter of one or any combination of Aspects 1-5 optionally includes processing circuitry configured to format a header of the data packet in the last retry attempt to indicate that the data packet uses the second communication protocol.

Aspect 7 includes subject matter (such as a method of operating a communication network) or can optionally be combined with one or any combination of Aspects 1-6 to include such subject matter, comprising sending a data packet from a first network node of the communication network to a second network node during a specified communication time slot, wherein the data packet is formatted according to a first communication protocol; resending, by the first network node, the data packet when the second network node does not respond during a specified acknowledge time slot; and resending the data packet for a last retry attempt of a finite number of retry attempts to send the data packet, wherein the first network node resends the data packet for the last retry attempt according to a second communication protocol that extends time of sending the data packet into the specified acknowledge time slot.

In Aspect 8, the subject matter of Aspect 7 optionally includes transmitting at least a portion of the data packet at a lower rate than the first protocol.

In Aspect 9, the subject matter of one or both of Aspects 7 and 8 optionally include the first network node reformatting the data packet to increase a payload of the data packet.

In Aspect 10, the subject matter of one or any combination of Aspects 7-9 optionally includes the first network node reformatting the data packet to increase data redundancy in the data packet relative to the first communication protocol.

In Aspect 11, the subject matter of one or any combination of Aspects 7-10 optionally includes the first network node formatting a header of the data packet to indicate that the data packet uses the second communication protocol.

In Aspect 12, the subject matter of one or any combination of Aspects 7-11 optionally includes the second network node determining that the next retry attempt is the last retry attempt of the finite number of retry attempts and changing to the second communication protocol in response to the determining.

Aspect 13 includes subject matter (such as a network node device of a communication network) or can optionally be combined with one or any combination of Aspects 1-12 to include such subject matter, comprising physical PHY layer circuitry configured to transmit and receive data packets via a communication network and processing circuitry connected to the PHY layer circuitry. The processing circuitry is configured to decode received data packets according to a first communication protocol; encode an acknowledge message for sending when not detecting errors in the received data packets; detect that one or more of the received data packets include errors; and decode a subsequently received data packet according to a second communication protocol when the one or more received data packets include errors.

In Aspect 14, the subject matter of Aspect 13 optionally includes processing circuitry configured to decode a header in the subsequently received data packet that indicates that the subsequently received data packet is to be decoded according to the second communication protocol.

In Aspect 15, the subject matter of one or both of Aspects 13 and 14 optionally include processing circuitry configured to count retry attempts of sending a first data packet of the one or more received data packets; and change to decoding the subsequently received data packet according to the second communication protocol when the count of retry attempts reaches a predetermined number or retry attempts.

Aspect 16 includes subject matter (or can optionally be combined with one or any combination of Aspects 1-15 to include such subject matter) such as a computer readable storage medium containing instructions that, when performed by processing circuitry of a network node device of a communication network, cause the processing circuitry to perform acts comprising encoding a data packet for sending to a second network node device during a specified communication time slot, wherein the data packet is formatted according to a first communication protocol; initiating resending the data packet when the second network node device does not respond during a specified acknowledge time slot; and encoding the data packet according to a second communication protocol for sending for a last retry attempt of a finite number of retry attempts to send the data packet, wherein the encoding of the data packet for the last retry attempt extends time of sending the data packet into the specified acknowledge time slot.

In Aspect 17 the subject matter of Aspect 16 optionally includes instructions that cause the processing circuitry to perform acts including encoding, according to the second communication protocol, at least a portion of the data packet at a lower rate than the first communication protocol.

In Aspect 18, the subject matter of one or both of Aspects 16 and 17 optionally includes instructions that cause the processing circuitry to perform acts including reformatting, according to the second communication protocol, the data packet to increase a payload of the data packet from the first communication protocol.

In Aspect 19, the subject matter of one or any combination of Aspects 16-18 optionally includes instructions that cause the processing circuitry to perform acts including encoding, according to the second communication protocol, the data packet to increase data redundancy in the data packet relative to the first communication protocol.

In Aspect 20, the subject matter of one or any combination of Aspects 16-19 optionally includes instructions that cause the processing circuitry to perform acts including encoding a header portion of the data packet to indicate that the data packet is using the second communication protocol.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A network node device of a communication network, the network node device comprising:
   physical PHY layer circuitry configured to transmit and receive data packets via a communication network; and
   processing circuitry connected to the PHY layer circuitry and configured to:
   decode received data packets according to a first communication protocol, wherein the first communication protocol includes a specified acknowledge time slot for the network node device to send an acknowledge message;
   encode the acknowledge message for sending during the specified acknowledge time slot when not detecting errors in the received data packets;
   detect that one or more of the received data packets include errors;
   detect that a next received data packet is a last retry attempt of sending the next received data packet; and
   decode a subsequently received data packet according to a second communication protocol when detecting that the next received data packet is the last retry attempt, wherein the second communication protocol includes receiving the subsequently received data packet within the specified acknowledge time slot of the first communication protocol.

2. The network node device of claim 1, wherein the processing circuitry is configured to decode a header in the subsequently received data packet that indicates that the subsequently received data packet is to be decoded according to the second communication protocol.

3. The network node device of claim 1, wherein the processing circuitry is configured to:
   count retry attempts of sending a first data packet of the one or more received data packets; and
   change to decoding the subsequently received data packet according to the second communication protocol when the count of retry attempts reaches a predetermined number or retry attempts.

4. The network node device of claim 3, wherein the processing circuitry is configured to:
   decode, according to the second communication protocol, the subsequently received data packet that is received during the specified acknowledge time slot of the first communication protocol when the count of retry attempts reaches a predetermined number or retry attempts.

5. A non-transitory computer readable storage medium containing instructions that, when performed by processing circuitry of a network node device of a communication network, cause the processing circuitry to perform acts comprising:
   decoding received data packets according to a first communication protocol, wherein the first communication protocol includes a specified acknowledge time slot for the network node device to send an acknowledge message;
   encoding the acknowledge message for sending during the specified acknowledge time slot when not detecting errors in the received data packets;
   detecting that one or more of the received data packets include errors;
   detecting that a next received data packet is a last retry attempt of sending the next received data packet; and
   decoding a subsequently received data packet according to a second communication protocol when detecting that the next received data packet is the last retry attempt, wherein the second communication protocol includes receiving the subsequently received data packet within the specified acknowledge time slot of the first communication protocol.

6. The non-transitory computer readable storage medium of claim 4, further containing instructions that cause the processing circuitry to perform acts including decoding a header in the subsequently received data packet that indicates that the subsequently received data packet is to be decoded according to the second communication protocol.

7. The non-transitory computer readable storage medium of claim 4, further containing instructions that cause the processing circuitry to perform acts including:
   counting retry attempts of sending a first data packet of the one or more received data packets; and
   changing to decoding the subsequently received data packet according to the second communication protocol when the count of retry attempts reaches a predetermined number or retry attempts.

8. The non-transitory computer readable storage medium of claim 7, further containing instructions that cause the processing circuitry to perform acts including:
   decoding, according to the second communication protocol, the subsequently received data packet that is received during the specified acknowledge time slot of the first communication protocol when the count of retry attempts reaches a predetermined number or retry attempts.

\* \* \* \* \*